United States Patent
Ono et al.

(10) Patent No.: US 10,250,766 B2
(45) Date of Patent: Apr. 2, 2019

(54) METHOD AND DEVICE FOR CHANGING DISPLAY LANGUAGE OF APPLICATION

(71) Applicants:Zentaroh Ono, Tokyo (JP); Shinichiro Aimi, Kanagawa (JP)

(72) Inventors: Zentaroh Ono, Tokyo (JP); Shinichiro Aimi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/907,431

(22) Filed: Feb. 28, 2018

(65) Prior Publication Data

US 2018/0278768 A1    Sep. 27, 2018

(30) Foreign Application Priority Data

Mar. 21, 2017  (JP) ................................. 2017-054172

(51) Int. Cl.
  *G06F 15/00* (2006.01)
  *G06F 3/12* (2006.01)
  (Continued)

(52) U.S. Cl.
  CPC ........... *H04N 1/00498* (2013.01); *G06F 8/61* (2013.01); *G06F 9/454* (2018.02);
  (Continued)

(58) Field of Classification Search
  CPC ........... H04N 1/00498; H04N 1/00413; H04N 1/00938; H04N 2201/0094; G06F 8/61
  (Continued)

(56) References Cited

U.S. PATENT DOCUMENTS 9,164,747 B2    10/2015  Ono
9,742,945 B2     8/2017  Ono
(Continued)

FOREIGN PATENT DOCUMENTS

EP    1870805    12/2007
EP    3002678     4/2016
(Continued)

OTHER PUBLICATIONS

Extended European Search Report for 18160895.1 dated Jul. 26, 2018.

*Primary Examiner* — Douglas Q Tran
(74) *Attorney, Agent, or Firm* — IPUSA, PLLC

(57) ABSTRACT

An imaging device includes an information processing terminal acting as an operation unit and a main unit implementing an imaging function. The information processing terminal includes: a language acquisition unit configured to obtain a predetermined selectable language of an operating system and a language of a character string added to an application program by a terminology module; a display unit configured to display the predetermined selectable language of the operating system and the language of the character string added to the application program by the terminology module, as a list of selectable language candidates, on a language setting screen provided to a user to select a display language of the operating system; and a language setting unit configured to change the display language of the operating system into the language selected from the list of the selectable language candidates by the user.

11 Claims, 14 Drawing Sheets

(51) Int. Cl.
  *G06K 1/00* (2006.01)
  *H04N 1/00* (2006.01)
  *G06F 9/451* (2018.01)
  *G06F 8/61* (2018.01)
(52) U.S. Cl.
  CPC ..... *H04N 1/00413* (2013.01); *H04N 1/00938* (2013.01); *H04N 2201/0094* (2013.01)
(58) Field of Classification Search
  USPC ............................... 358/1.1, 1.13, 1.15, 1.14
  See application file for complete search history.

(56) References Cited

U.S. PATENT DOCUMENTS

| | | | |
|---|---|---|---|
| 9,769,339 B2 | 9/2017 | Ono | |
| 2009/0112574 A1 | 4/2009 | Zou | |
| 2009/0198789 A1 | 8/2009 | Young et al. | |
| 2011/0258349 A1* | 10/2011 | Abe | G06F 9/451 710/14 |
| 2012/0271621 A1* | 10/2012 | Jia | G06F 9/454 704/8 |
| 2012/0278063 A1 | 11/2012 | Chang et al. | |
| 2013/0227522 A1 | 8/2013 | Lerum et al. | |
| 2014/0250444 A1 | 9/2014 | Ono | |

FOREIGN PATENT DOCUMENTS

| | | |
|---|---|---|
| JP | 2004-112341 | 4/2004 |
| JP | 2014-063472 | 4/2014 |

\* cited by examiner

FIG.5

| LANGUAGE IN TERMINOLOGY FILE | EXAMPLE OF TERMINOLOGY FILE (xml file) |
|---|---|
| Japanese | <string name="app_name">アプリ</string> |
| English | <string name="app_name">app</string> |
| German | <string name="app_name">anwendung</string> |

FIG.6

| TAG | EXAMPLE OF DESCRIPTION |
|---|---|
| overlay | <overlay OS:targetPackage="com.example.app" OS:priority="1" /> |
| meta-data | <meta-data OS:name="language" OS:value="en" /> |

FIG.9

| MODULE | AP | | | TERMINOLOGY MODULE 1 | | TERMINOLOGY MODULE 2 | |
|---|---|---|---|---|---|---|---|
| LANGUAGE IN TERMINOLOGY FILE | Default | Japanese | English | Japanese | Japanese | German |
| PRIORITY | 0 | 0 | 0 | 1 | 10 | 10 |
| TERM ID: app_name | app(def) | アプリ | app | アプリケーション | アプリX | Anwendung |

FIG.11

| Japanese | アプリX |
|---|---|
| English | app |
| German | Anwendung |
| French | app(def) |

METHOD AND DEVICE FOR CHANGING DISPLAY LANGUAGE OF APPLICATION

CROSS-REFERENCE TO RELATED APPLICATION

The present application claims priority under 35 U.S.C. § 119 to Japanese Patent Application No. 2017-054172, filed on Mar. 21, 2017, the contents of which are incorporated herein by reference in their entirety.

BACKGROUND OF THE INVENTION

1. Field of the Invention

The present disclosure relates to an imaging device, an imaging system, and a language setting method.

2. Description of the Related Art

Normally, a character string displayed on a screen of an application program is embedded in the application program, in a case in which the application program is configured to be executed on, for example, Android (Registered Trademark), which is an operating system (OS). Additionally, a technique for dynamically changing a character string displayed on a screen of an application program is already known. Also a technique for adding a character string that is not embedded in an application program is known.

There is known a related art for displaying a character string in a language desired by a user. In the related art, an application program installed in an information processing device is composed of a program logic and a language resource module. By switching the language resource module, the information processing device can change a language of a character string to be displayed (see Japanese Unexamined Patent Application Publication No. 2014-63472 for example).

In the technique for dynamically changing a character string displayed on a screen of an application program, since selectable display languages of an OS that are displayed on a language setting screen are fixed, a user cannot change types of the languages displayed on the language setting screen afterward. Therefore, in the technique described above, even if a character string written in a new language is added, the user cannot select the new language from the language setting screen.

SUMMARY OF THE INVENTION

To solve the above problem, according to one aspect of the present disclosure, there is provision of an imaging device including an information processing terminal acting as an operation unit and a main unit implementing an imaging function. The information processing terminal includes: a language acquisition unit configured to obtain a predetermined selectable language of an operating system and a language of a character string added to an application program by a terminology module; a display unit configured to display the predetermined selectable language of the operating system and the language of the character string added to the application program by the terminology module, as a list of selectable language candidates, on a language setting screen provided to a user to select a display language of the operating system; and a language setting unit configured to change the display language of the operating system into the language selected from the list of the selectable language candidates by the user.

BRIEF DESCRIPTION OF THE DRAWINGS

FIG. 5 illustrates an example of terminology file;

FIG. 6 is a drawing illustrating additional tags described in "osManifest.xml";

FIG. 9 illustrates an example of a terminology file of an AP or a terminology module;

FIG. 11 is a diagram illustrating an example of character strings to be selected in accordance with setting languages;

DESCRIPTION OF THE EMBODIMENTS

In the following, embodiments of the present disclosure will be described with reference to the drawings.

(First Embodiment)

<Hardware Configuration>

Figure 1:
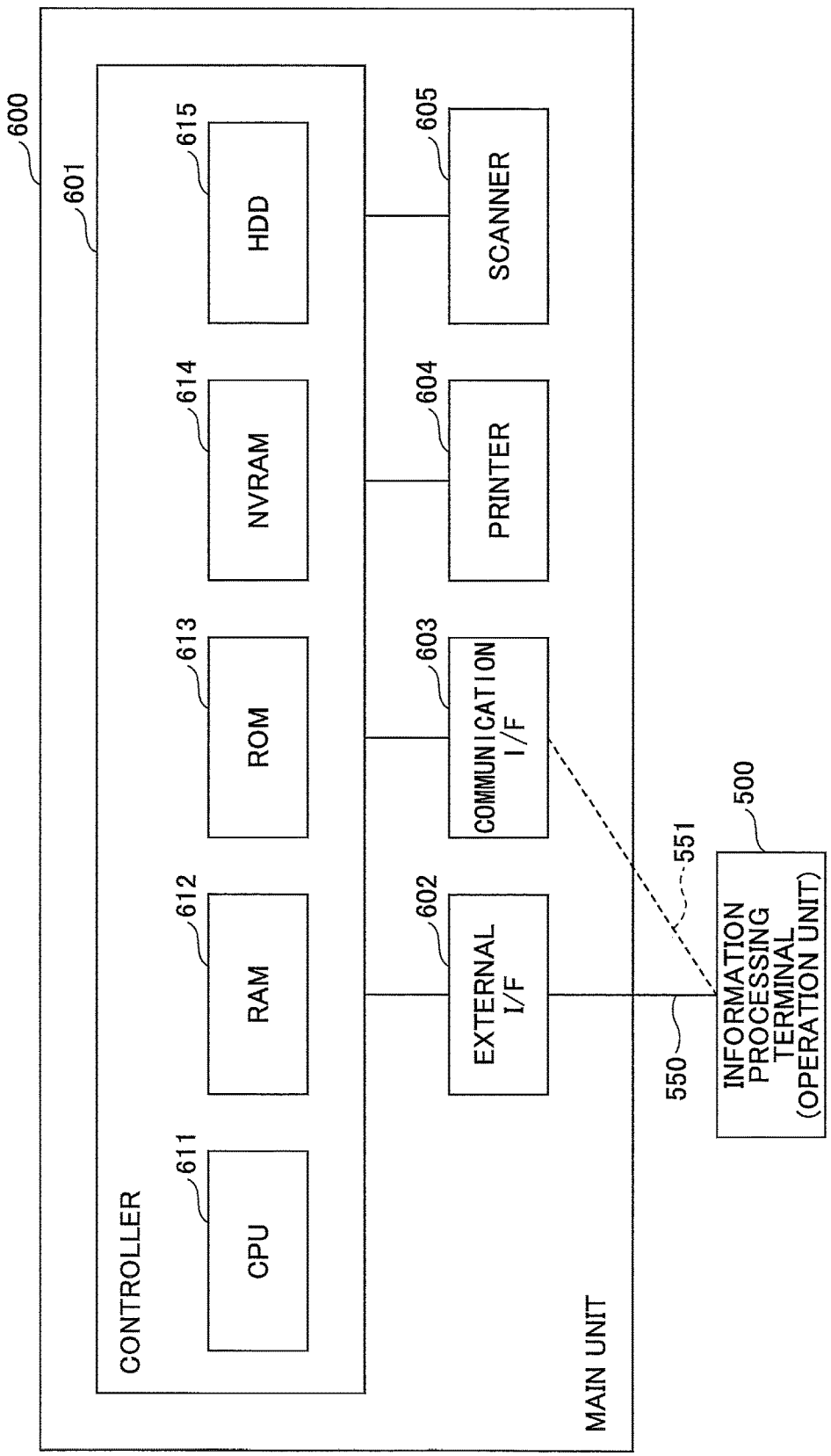
FIG. 1 is a diagram illustrating an example of a hardware configuration of an imaging device according to an embodiment.

A hardware configuration of an imaging device 1 will be described with reference to FIG. 1. FIG. 1 is a diagram illustrating an example of a hardware configuration of the imaging device according to the present embodiment. FIG. 1 illustrates a case in which the imaging device 1 is an MFP (multifunction peripheral). However, the imaging device 1 may not necessarily be an MFP. The MFP is a device equipped with multiple functions such as a printing function, a scanner function, and a copying function.

The imaging device 1 illustrated in FIG. 1 includes an information processing terminal 500 and a main unit 600. The information processing terminal 500 acts as an operation unit for receiving an operation from a user. The information processing terminal 500 may be an information processing terminal such as a tablet terminal. The main unit 600 embodies various functions concerning image forming, such as a printing function, a scanner function, and a copying function.

The information processing terminal 500 and the main unit 600 are communicably connected to each other via a communication path 550. As the communication path 550, for example, a path in compliance with USB (Universal Serial Bus) standard can be used. The information processing terminal 500 may also be connected to the main unit 600 via a communication path 551 employing LAN (Local Area Network) or a wireless communication path such as Bluetooth (Registered Trademark). The imaging device 1 illustrated in FIG. 1 may be regarded as an imaging system (image forming system) equipped with the information processing terminal 500 and the main unit 600.

The main unit 600 includes a controller 601, an external I/F 602, a communication I/F 603, a printer 604, a scanner 605, and the like. The controller 601 includes a CPU 611, a RAM 612, a ROM 613, an NVRAM 614, an HDD 615, and the like. The ROM 613 stores various programs or data. The RAM 612 temporarily stores programs or data. The NVRAM 614 stores, for example, setup information or the like. The HDD 615 stores various programs or data.

The CPU 611 performs overall control of the main unit 600 and various functions of the main unit 600, by loading a program, data, setup information, or the like, into the RAM 612 from the ROM 613, the NVRAM 614, or the HDD 615, and by performing processing.

The external I/F 602 is an interface used for communicating with the information processing terminal 500 via the communication path 550. The communication I/F 603 is an interface for connecting the main unit 600 to the information processing terminal 500 or a network via the communication path 551.

The printer 604 is a printing device for printing print data on material. The material to be printed may not necessarily be paper. Examples of the material include paper, coated paper, cardboard, a transparency, plastic film, prepreg, and copper foil. The scanner 605 is a reading device for reading image data (an electronic data) from a paper document to generate an image file (an electronic file).

Figure 2:
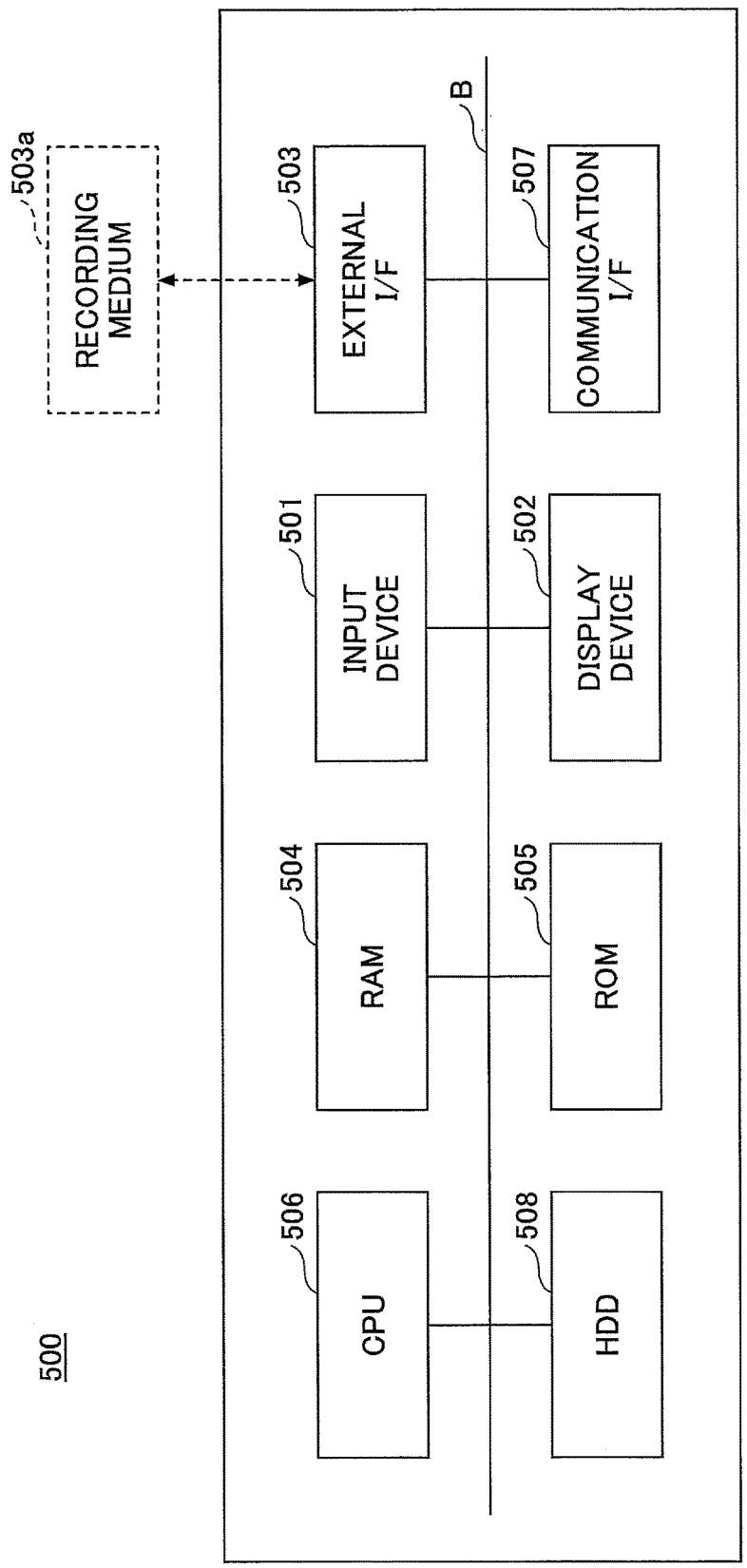
FIG. 2 is a diagram illustrating an example of a hardware configuration of an information processing terminal according to the embodiment.

The information processing terminal 500 that acts as an operation unit is embodied by a computer, such as a computer having hardware architecture illustrated in FIG. 2. FIG. 2 is a diagram illustrating an example of a hardware configuration of the information processing terminal according to the present embodiment.

The information processing terminal 500 illustrated in FIG. 2 includes an input device 501, a display device 502, an external I/F 503, a RAM 504, a ROM 505, a CPU 506, a communication I/F 507, an HDD 508, and the like, each of which are interconnected via a bus B.

The input device 501 includes a touch panel, a hardware key, and the like. The input device 501 is used by a user to input an operation signal. The display device 502 is a device for displaying information, and includes a liquid crystal display (LCD) and the like. The communication I/F 507 is an interface for connecting the information processing terminal 500 to the main unit 600 or various networks.

The HDD 508 is a non-volatile storage device for storing a program or data. Examples of the program or data stored in the HDD 508 include, an OS which is basic software for controlling the information processing terminal 500 in its entirety and the like, and an application program running on the OS to provide various functions. Instead of the HDD 508, a drive device using a flash memory as a recording medium (for example, a solid state drive (SSD)) may be used.

The external I/F 503 is an interface with a recording medium 503*a*. The information processing terminal 500 can read or write data from/to the recording medium 503*a* via the external I/F 503. Examples of the recording medium 503*a* include a flexible disk, a CD, a DVD, an SD memory card, a USB memory, and the like.

The ROM 505 is an example of a non-volatile semiconductor memory (storage device) which can retain a program or data even when power is turned-off. In the ROM 505, programs and data, such as BIOS executed at a time of booting up the information processing terminal 500, OS setup information, and network setup information, are stored. The RAM 504 is an example of a volatile semiconductor memory (storage device) for temporarily storing a program or data.

The CPU 506 is a processing unit which performs overall control of the information processing terminal 500 and performs various functions of the information processing terminal 500, by loading a program or data stored in the ROM 505 or the HDD 508 into the RAM 504, and performing processing. Because of the hardware configuration illustrated in FIG. 2, the information processing terminal 500 acts as an input unit for receiving a user input, and a display unit for displaying information.

<Software Configuration>

Figure 3:
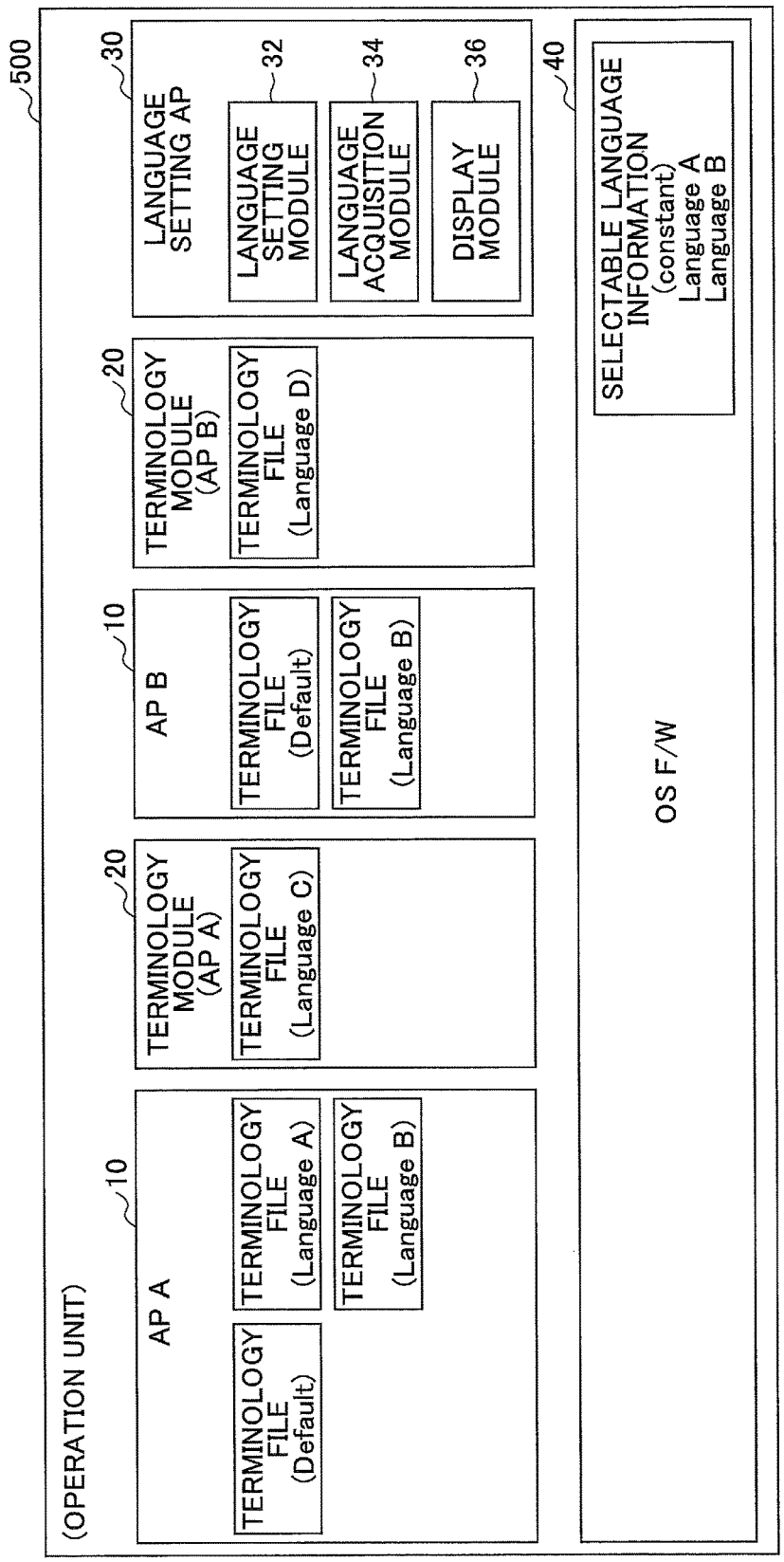
FIG. 3 is a diagram illustrating an example of a software configuration of the information processing terminal acting as an operation unit.

Next, a functional configuration of the information processing terminal 500 in the imaging device 1 according to the present embodiment will be explained. FIG. 3 is a diagram illustrating an example of a software configuration of the information processing terminal acting as the operation unit.

The information processing terminal 500 illustrated in FIG. 3 includes application programs (APs) 10, terminology modules 20 corresponding to the APs 10, a language setting AP 30, and an OS framework (OS F/W) 40.

The OS F/W 40 is an OS of the information processing terminal 500. An example of the OS F/W 40 includes Android (Registered Trademark). The AP 10 is a program working on the OS F/W 40 of the information processing terminal 500. The AP 10 can retain multiple terminology files. The terminology file stores at least one message (character string) to be displayed on a screen of the AP 10. The messages stored in one terminology file are written in a same language such as Japanese or English.

The terminology module 20 is a module including terminology to be added to the AP 10 or to modify the terminology in the AP 10. The terminology module 20 can retain multiple terminology files. The format of the terminology module 20 is similar to the format of the AP 10. The language setting AP 30 is a type of application program for changing a display language set to the OS F/W 40. The language setting AP 30 includes a language setting module 32, a language acquisition module 34, and a display module 36.

The language setting module 32 changes a display language set to the OS F/W 40. The language acquisition module 34 acquires a language of the terminology file included in the terminology module 20 and a selectable language for the OS F/W 40. The OS F/W 40 maintains information concerning the selectable language as constant information (hereinafter referred to as "selectable language information"). The display module 36 displays a language setting screen for changing the display language for the OS F/W 40 on the display device 502.

Figure 4:
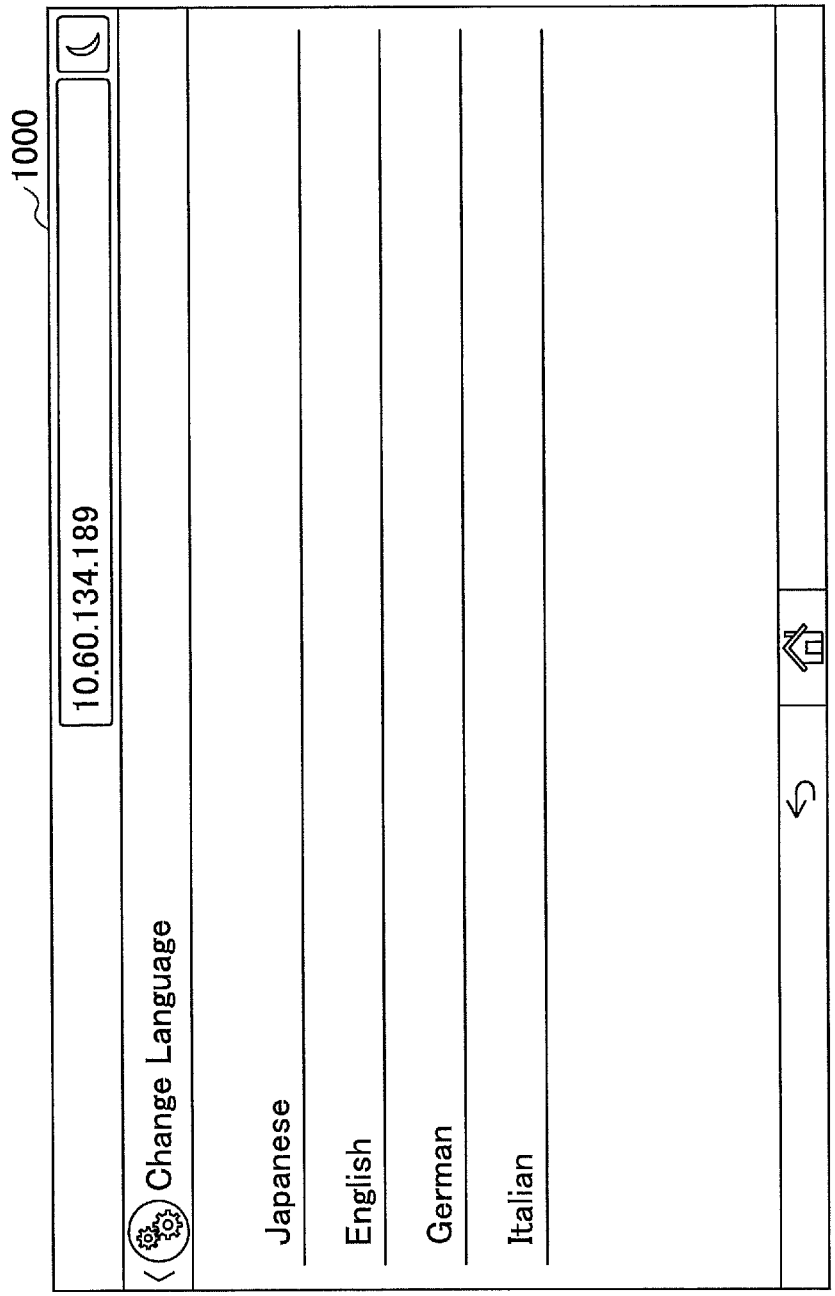
FIG. 4 is a diagram illustrating an example of a language setting screen.

FIG. 4 is a diagram illustrating an example of the language setting screen. The language setting screen 1000 illustrated in FIG. 4 displays a list of selectable language candidates. The selectable language candidates displayed on the language setting screen 1000 includes the language of the terminology file included in the terminology module 20 and the selectable language for the OS F/W 40, which are acquired by the language acquisition module 34. That is, on the language setting screen 1000 illustrated in FIG. 4, the language of the terminology file included in the terminology module 20 that was added by installation is also displayed in a selectable manner, in addition to the selectable language maintained by the OS F/W 40. Accordingly, a user of the information processing terminal 500 can select a language, which was dynamically added by an installation of software, on the language setting screen 1000.

FIG. 5 illustrates an example of the terminology file. Different terminology files are prepared for each language. In each of the terminology files, a term having a same term ID (in a case illustrated in FIG. 5, the term ID is "app_name") is defined. If a program code of the AP 10 is described such that the term ID is designated in a portion of the program code instructing to display a character string somewhere on an application screen (a screen displayed by the AP 10), the AP 10 can display different character strings in accordance with selection of different display languages. In FIG. 5, described is an example in which a Japanese character string "アプリ", an English character string "app", and a German character string "Anwendung", corresponding to the term ID "app_name", are defined.

Further, the AP 10 and the terminology module 20 include a file "osManifest.xml" storing application information. Here, information specific to the terminology module 20 will be explained. FIG. 6 is a drawing illustrating additional tags described in "osManifest.xml".

A tag "overlay" represents a target application (AP) in which the terms are added or modified by the terminology module 20. Also, a package name of the target AP is described in "targetPackage" to designate an AP where the terms are added or modified.

A priority level is set in "priority" element. When multiple terminology modules having the same "targetPackage" are installed in the information processing terminal 500, priority of the terminology modules can be determined by the "priority" element.

With respect to "name" element in the tag "meta-data", "language" is fixedly set. A language code of the language included in the terminology module 20 is set to "value" element in the tag "meta-data". Examples of the language code include "en" or "ja". When multiple language codes are to be set, the multiple language codes may be connected by a comma ",", like "en,ja" for example.

<Processing Details>

Figure 7:
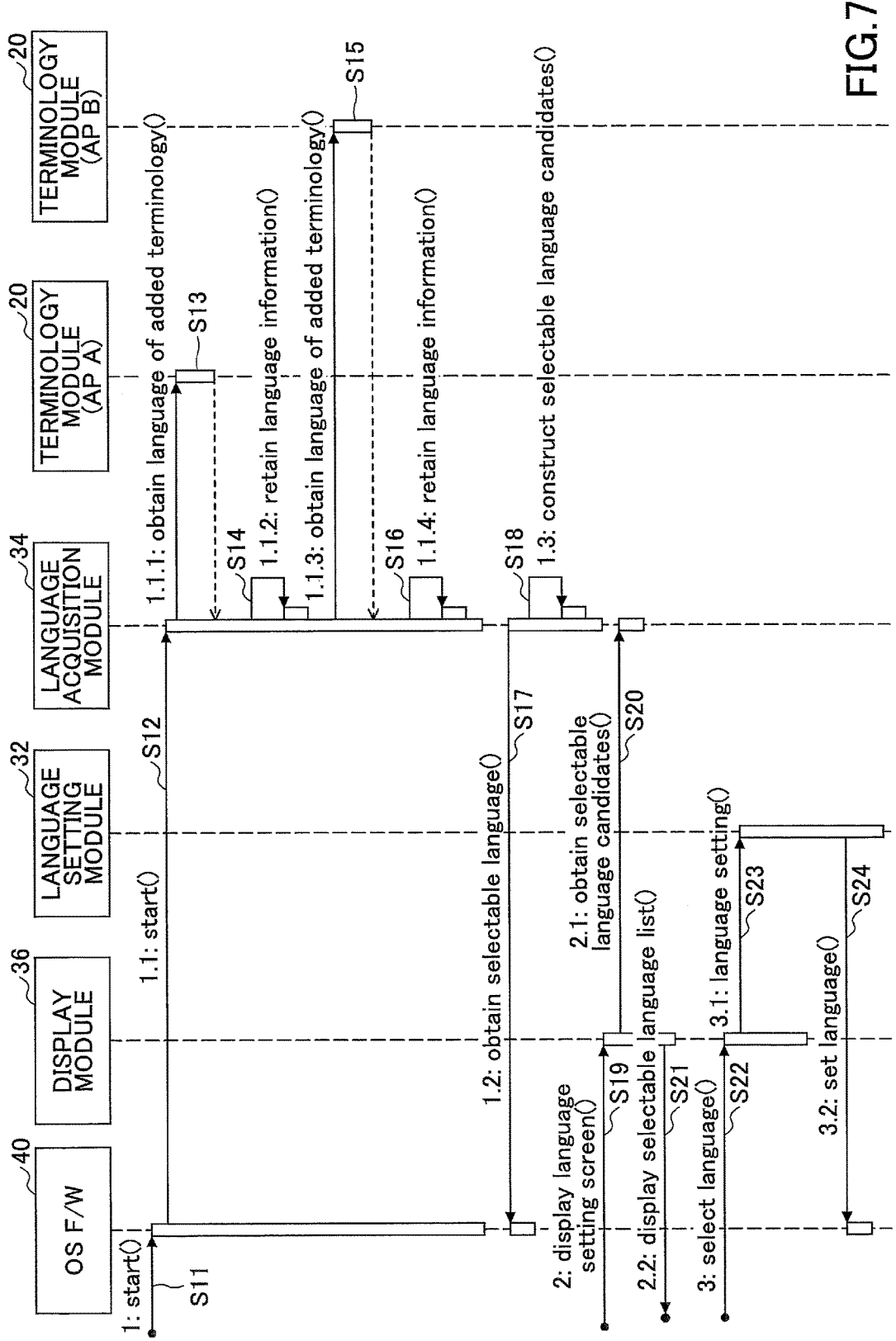
FIG. 7 is a diagram illustrating an example of a flow of a language setting process performed in the imaging device according to a first embodiment.

Next, a language setting process performed in the imaging device 1 according to the present embodiment will be described. FIG. 7 is a diagram illustrating an example of a flow of a language setting process performed in the imaging device 1 according to the present embodiment.

At step S11, the OS F/W 40 is started. At step S12, the OS F/W 40 requests the language acquisition module 34 to start processing. When the language acquisition module 34 starts, the language acquisition module 34 obtains and retains a language included in each of the terminology modules 20. For example, in FIG. 7, the language acquisition module 34 obtains a language of added terminology from the terminology module 20 of an AP A at step S13, and retains the obtained language as language information at step S14. Further, in FIG. 7, the language acquisition module 34 obtains a language of added terminology from the terminology module 20 of an AP B at step S15, and retains the obtained language as language information at step S16.

The language acquisition module 34 also obtains the selectable language information from the OS F/W 40 at step S17. At step S18, the language acquisition module 34 merges a language obtained from each of the terminology modules 20 and the selectable language information obtained from the OS F/W 40, and constructs selectable language candidates.

At step S19, a user performs an operation to cause the information processing terminal 500 to display the language setting screen 1000. At step S20, the display module 36 obtains the selectable language candidates constructed at step S18 from the language acquisition module 34. At step S21, the display module 36 provides to the user the language setting screen 1000 in which the selectable language candidates obtained at step S20 are listed.

At step S22, the user performs an operation to select one language from the list of the selectable language candidates displayed on the language setting screen 1000. At step S23, the display module 36 requests the language setting module 32 to perform language setting. At step S24, the language setting module 32 requests the OS F/W 40 to perform language setting. In response to the request, the OS F/W 40 changes a display language of the OS F/W 40 to the language selected at step S22. Hereinafter, the display language determined here may be referred to as a "setting language".

Figure 8:
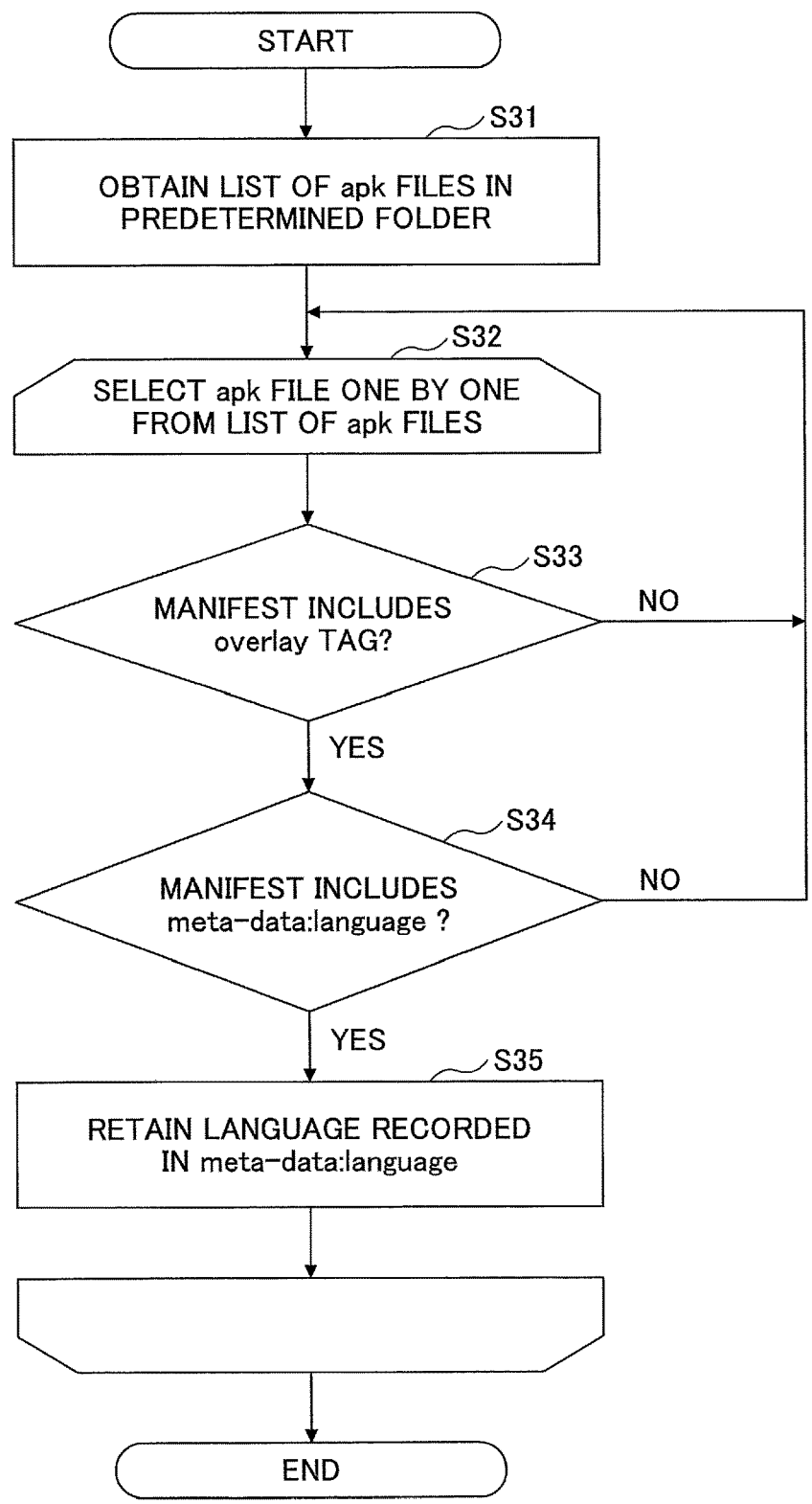
FIG. 8 is a flowchart illustrating a process performed by the language acquisition module to obtain and retain a language of each terminology module.

Details of the process performed by the language acquisition module 34 to obtain and retain a language of each terminology module 20 will be described. FIG. 8 is a flowchart illustrating the process performed by the language acquisition module to obtain and retain a language of each terminology module.

At step S31, the language acquisition module 34 obtains a list of the APs 10 and the terminology modules 20 stored in a predetermined folder. In FIG. 8, the APs 10 and the terminology modules 20 are referred to as "apk files".

At step S32, the language acquisition module 34 selects one apk file among a list of the apk files, and performs steps S33 and thereafter with respect to the selected apk file. With respect to every apk file in the list, the language acquisition module 34 performs steps S33 and thereafter. At step S33, the language acquisition checks whether the file "osManifest.xml" (illustrated in FIG. 6) includes a tag "overlay" or not.

If the tag "overlay" is not found in the selected apk file, the language acquisition module 34 determines that the apk file obtained at step S32 is not a terminology module 20. In this case, the process reverts to step S32, and the language acquisition module 34 obtains another apk file and continues the process. If the tag "overlay" is found, the language acquisition module 34 determines that the apk file obtained at step S32 is a terminology module 20. In this case, the process proceeds to step S34.

At step S34, the language acquisition module 34 checks whether a tag "meta-data" in the file "osManifest.xml" (illustrated in FIG. 6) includes an element "language" or not. If the tag "meta-data" does not include the element "language", the process reverts to step S32, and the language acquisition module 34 obtains another apk file and continues the process.

If the tag "meta-data" includes the element "language", the process proceeds to step S35. At step S35, the language acquisition module 34 identifies a language of the terminology module 20 (apk file) by reading the tag "meta-data", and retains the identified language. When the process at steps S33 and thereafter is completed with respect to every apk file, the process illustrated in FIG. 8 terminates. By performing the process illustrated in FIG. 8, the language acquisition module 34 can obtain a list of language(s)

included in the terminology module(s) 20 installed in the information processing terminal 500.

FIG. 9 illustrates an example of a terminology file in an AP or a terminology file in a terminology module. FIG. 9 illustrates an example of a term retained in an AP 10 installed in the information processing terminal 500 and retained in two terminology modules 20 corresponding to the AP 10. Hereinafter, the two terminology modules 20 corresponding to the AP 10 will be referred to as a "Terminology Module 1" and a "Terminology Module 2" respectively. A column "Terminology Module 1" and a column "Terminology Module 2" in FIG. 9 respectively represent contents stored in the Terminology Module 1 and the Terminology Module 2.

The AP 10 retains a default character string, a Japanese character string, and an English character string, each corresponding to the term ID "app_name". Though a priority level of the AP 10 is not configurable, the terms retained in the AP are treated as having the lowest priority level. FIG. 9 illustrates the priority level of the AP 10 as "0" for convenience.

The priority level of the Terminology Module 1 is "1", and the Terminology Module 1 includes a Japanese terminology file. Also, the priority level of the Terminology Module 2 is "10", and the Terminology Module 2 includes a Japanese terminology file and a German terminology file.

Figure 10:
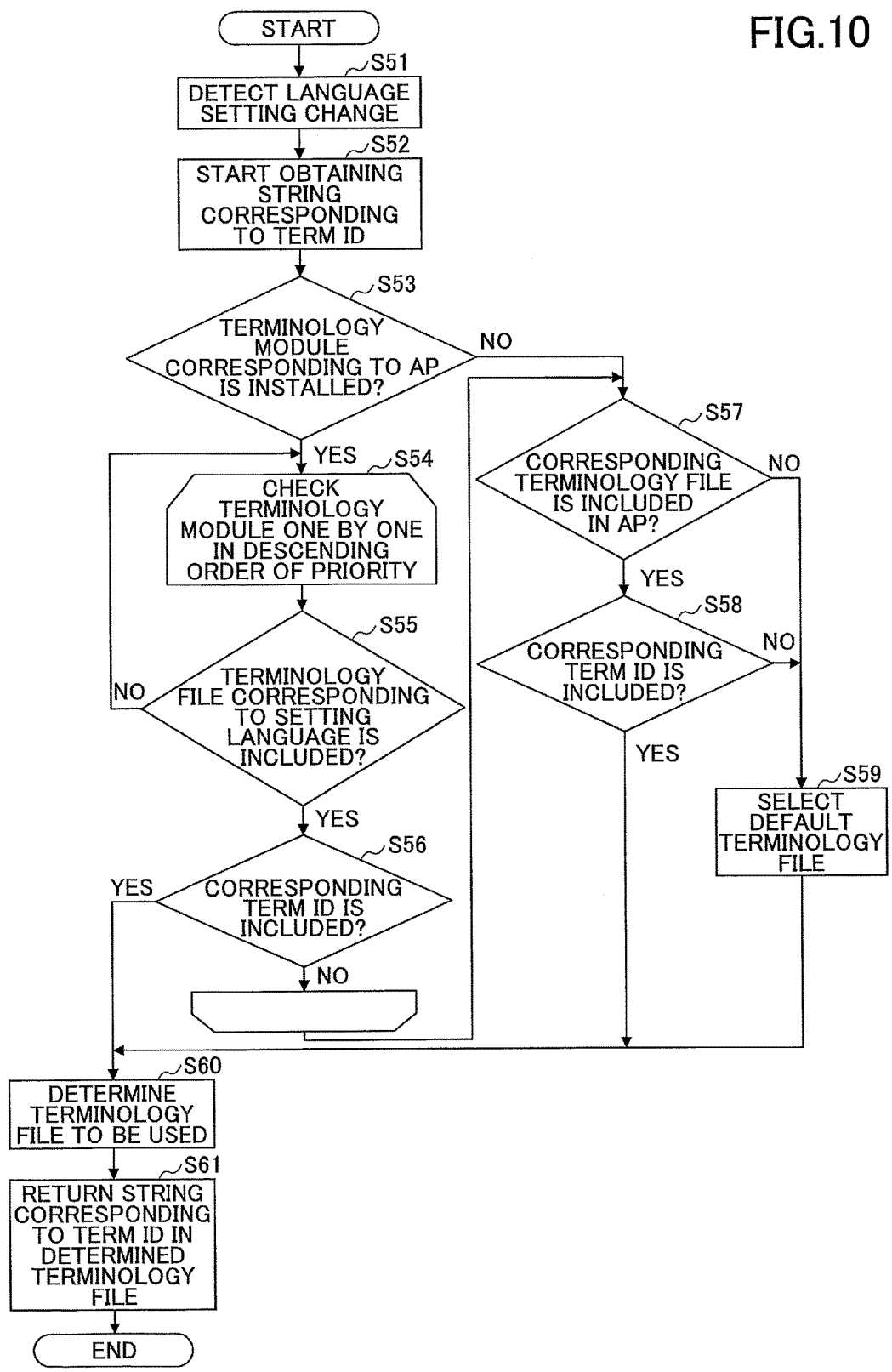
FIG. 10 is a flowchart illustrating an example of a process for selecting a character string for display.

FIG. 10 is a flowchart illustrating an example of a process for selecting a character string for display. The OS F/W 40 selects a character string to be displayed on an application screen in accordance with the flowchart illustrated in FIG. 10. Note that the following describes a case in which a character string is selected among multiple character strings corresponding to one term ID. Further, the AP 10 obtains a character string to be displayed on an application screen of the AP 10 from the OS F/W 40 by designating the term ID.

When the AP 10 creates the application screen of the AP 10, the AP 10 obtains a character string to be displayed on the application screen from the OS F/W 40. The AP 10 maintains a status of the application screen (activity) being displayed. The application screen takes one of the following four states: Create, Resume, Pause, and Destroy. Generally, the AP 10 creates the application screen when the application screen is in Create state, which is a state when an activity is newly displayed.

Even when the status is in Resume or Pause state, the AP 10 needs to recreate the application screen if a display language setting is changed. In the information processing terminal 500 according to the present embodiment, when a display language setting is changed during Resume or Pause state, the status of the activity is transited to Destroy state forcibly by the OS F/W 40. Therefore, when a display language setting is changed, the activity of the AP 10 having been displayed is recreated. Further, the hidden activity of the AP 10 will be recreated when the activity is refreshed.

At step S51, the OS F/W 40 detects that the display language setting has been changed. At step S52, the OS F/W 40 receives a request from the AP 10 creating (or recreating) an application screen to obtain a character string to be displayed, with a designation of a term ID. The timing of creation (or recreation) of the application screen by the AP 10 is as mentioned above.

At step S53, the OS F/W 40 determines whether a terminology module 20 corresponding to the AP 10 having issued the request at step S52 is installed or not (hereinafter, the AP 10 having issued the request at step S52 is referred to as a "request source AP"). If a terminology module 20 corresponding to the request source AP is installed, the process proceeds to step S54. At step S54, the OS F/W 40 selects one terminology module 20 having the highest priority level, among the terminology modules 20 corresponding to the request source AP prior to completion of checks of steps S55 and S56.

At step S55, the OS F/W 40 determines whether the terminology module 20 selected at step S54 includes a terminology file corresponding to the setting language. When a terminology file corresponding to the setting language is not found, the process reverts to step S54, and the OS F/W 40 repeats steps S54 and thereafter. When a terminology file corresponding to the setting language is found, the OS F/W 40 determines whether the term ID designated at step S52 is included in the terminology file or not (step S56). When the term ID designated at step S52 is not included in the terminology file, the process reverts to step S54, and the OS F/W 40 repeats steps S54 and thereafter.

At step S56, if the term ID designated at step S52 is included in the terminology file found at step S55, the process proceeds to step S60 and the OS F/W 40 determines that the terminology file found at step S55 should be used. When the checks at steps S55 and S56 are done with all terminology modules 20 corresponding to the request source AP, but if a terminology file including the term ID designated at step S52 is not found, the process proceeds to step S57. Similarly, if it is determined, at step S53, that a terminology module 20 corresponding to the request source AP is not installed, the process also proceeds to step S57.

At step S57, the OS F/W 40 determines whether the AP 10 includes a terminology file corresponding to the setting language. When a terminology file corresponding to the setting language is found, the OS F/W 40 determines whether the term ID designated at step S52 is included in the terminology file found at step S57 (step S58). If the term ID designated at step S52 is included in the terminology file, the process proceeds to step S60 and the OS F/W 40 determines that the terminology file found at step S57 should be used.

If, at step S57, a terminology file corresponding to the setting language is not included in the AP 10, the OS F/W 40 selects a default terminology file at step S59, and at step S60, the OS F/W 40 determines that the default terminology file should be used. Similarly, when it is determined at step S58 that the term ID designated at step S52 is not included in the terminology file, the process also proceeds to step S59. That is, the OS F/W 40 selects a default terminology file and determines that the default terminology file should be used (steps S59 and S60). Note that in the present embodiment it is prerequisite that a default terminology file is included in each AP 10.

After step S60, the process proceeds to step S61. At step S61, the OS F/W 40 reads a character string corresponding to the designated term ID from the terminology file which was determined to be used, and returns the character string to the request source AP. Accordingly, if the AP 10 issues a request with a term ID for obtaining a character string to the OS F/W 40, the AP 10 can obtain a character string corresponding to the setting language, which is selected among character strings of multiple languages corresponding to the term ID.

When the OS F/W 40 performs the process for selecting a character string in accordance with a flowchart illustrated in FIG. 10, if contents of the AP 10 and the corresponding terminology module 20 are as illustrated in FIG. 9, character strings illustrated in FIG. 11 are obtained depending on the setting languages. FIG. 11 is a diagram illustrating an example of character strings to be selected in accordance with setting languages.

When the setting language is changed to Japanese, the character string "アプリ" is selected from a Japanese terminology file in the "Terminology Module 2" having priority "10". When the setting language is changed to English, the character string "app" is selected from an English terminology file in the AP 10 having priority "0". When the setting language is changed to German, the character string "Anwendung" is selected from a German terminology file in the "Terminology Module 2" having priority "10". Further, when the setting language is changed to French, the character string "app(def)" is selected from a default terminology file in the AP 10 having priority "0".

<Summary>

According to the present embodiment, the information processing terminal 500 and the imaging device 1 including the information processing terminal 500 as an operation unit can be provided, in which a language added dynamically by installing a terminology module 20 can be selected as a display language for the OS F/W 40 on a language setting screen 1000.

(Second Embodiment)

In the first embodiment, an install of a terminology module 20 is done on a per-terminology module basis. A second embodiment describes a case in which multiple terminology modules 20 are installed into the information processing terminal 500 on a per-language basis. Since most of the elements and the functions described in the second embodiment are similar to those described in the first embodiment, description of these elements and functions will be omitted.

Figure 12:
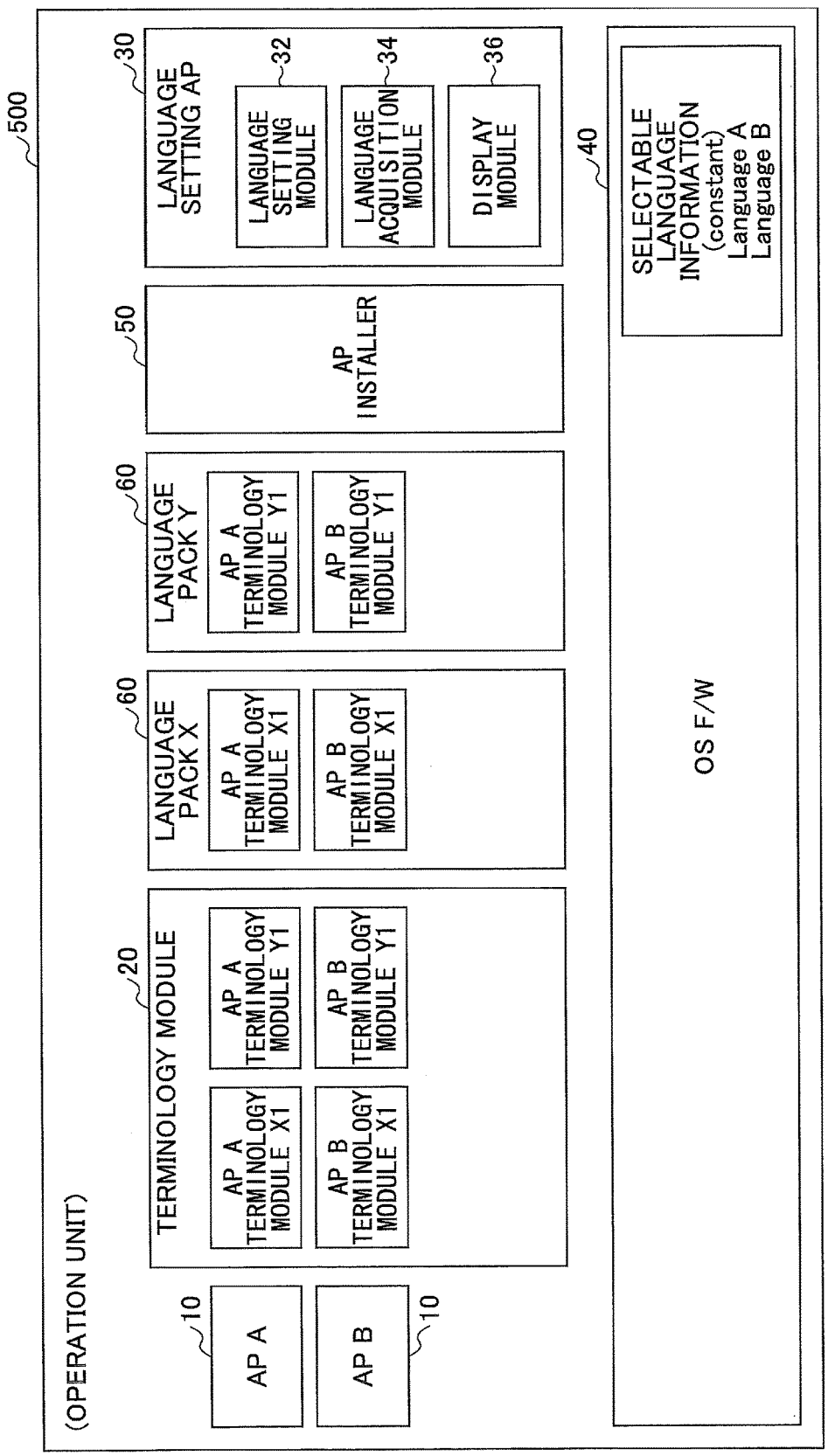
FIG. 12 is a diagram illustrating an example of a software configuration of an information processing terminal acting as an operation unit according to a second embodiment.

FIG. 12 is a diagram illustrating an example of a software configuration of an information processing terminal acting as an operation unit according to the second embodiment. The information processing terminal 500 illustrated in FIG. 12 includes application programs (APs) 10, terminology modules 20, a language setting AP 30, an OS framework (OS F/W) 40, an AP installer 50, and language packs 60.

Since the AP 10, the terminology module 20, the language setting AP 30, and the OS F/W 40 are the same software as illustrated in FIG. 3, the description of these software will be omitted. The AP installer 50 is a module used for installing the language pack 60 and copying the terminology module 20 in the language pack 60 into a predetermined folder.

The language pack 60 is a module containing multiple terminology modules 20. The language pack 60 retains information of a language of the multiple terminology modules 20 contained in the language pack 60. In the second embodiment, a tag "meta-data" (FIG. 6) described in the first embodiment is retained by the language pack 60 instead of the terminology module 20.

Figure 13:
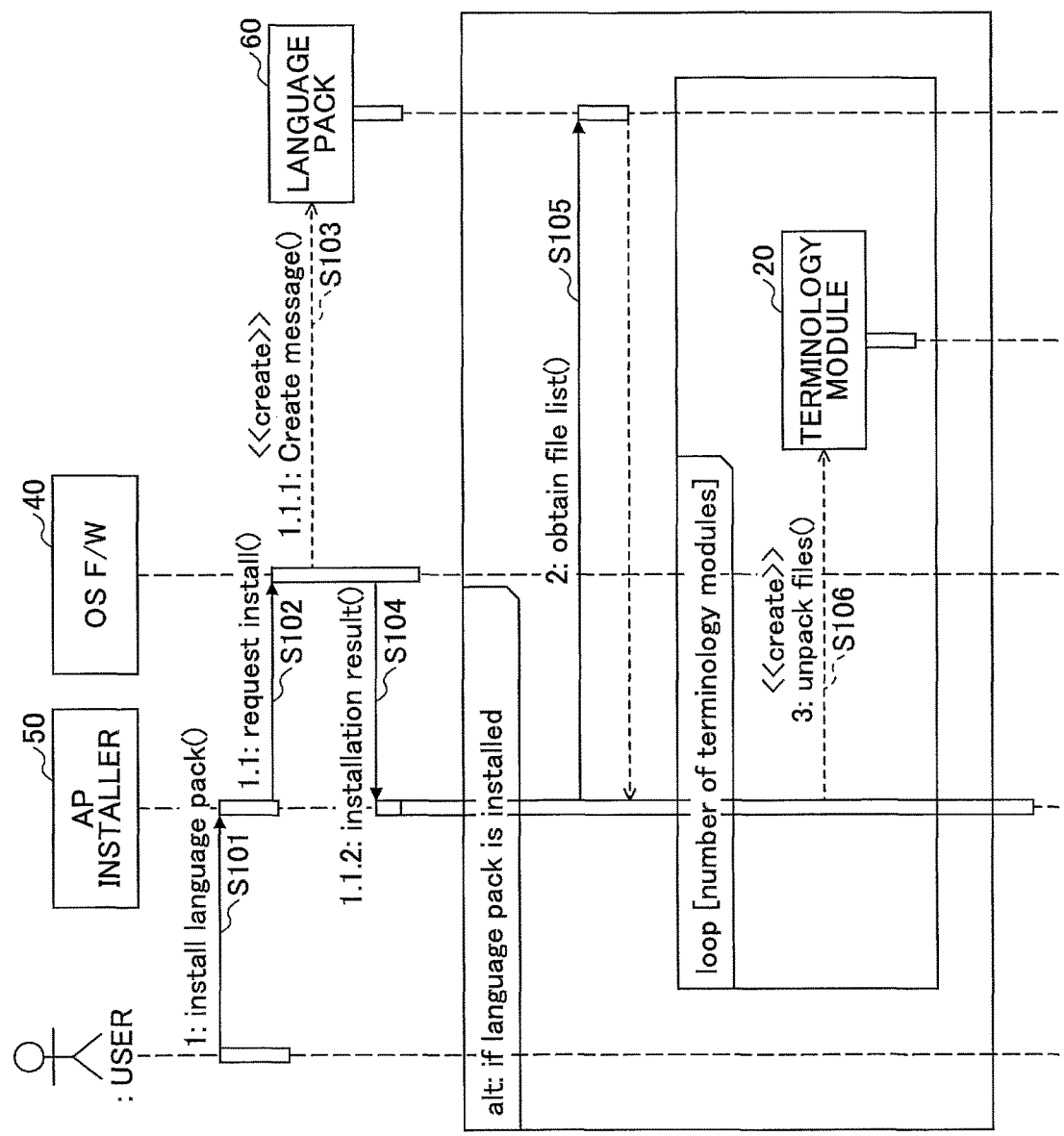
FIG. 13 is a diagram illustrating an example of a flow of an installation process of a language pack.

FIG. 13 is a diagram illustrating an example of a flow of an installation process of a language pack 60. The AP installer 50 installs a language pack 60 in accordance with the process flow illustrated in FIG. 13.

At step S101, a user instructs the AP installer 50 to install a language pack 60. At step S102, the AP installer 50 requests the OS F/W 40 to install the language pack 60. At step S103, the OS F/W 40 installs the language pack 60. At step S104, a result of the installation is returned to the AP installer 50.

If an application program that was installed in the process described here is a language pack 60, the AP installer 50 obtains a list of terminology modules 20 included in the language pack 60 (step S105). The AP installer 50 performs an unpacking operation for as many times as the number of the terminology modules 20 included in the language pack (step S106), thereby to copy the terminology modules 20 in the language pack 60 into a predetermined folder.

Figure 14:
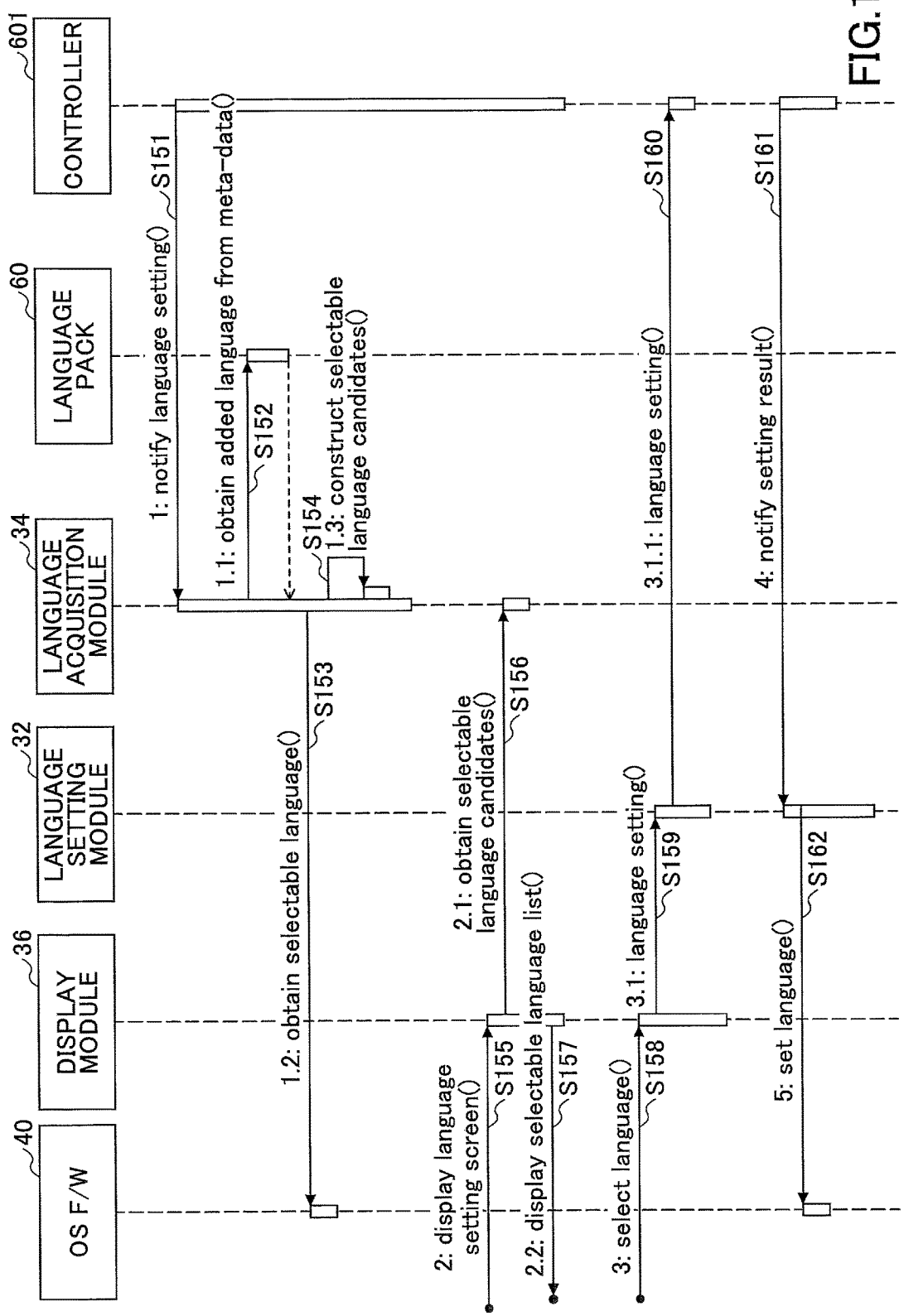
FIG. 14 is a diagram illustrating an example of a flow of a language setting process performed in the imaging device according to the second embodiment.

FIG. 14 is a diagram illustrating an example of a flow of a language setting process performed in the imaging device according to the present embodiment. The information processing terminal 500 having a software architecture illustrated in FIG. 12 performs the language setting process in accordance with the process flow illustrated in FIG. 14. FIG. 14 illustrates a process flow performed in a case in which both the information processing terminal 500 acting as an operation unit and a controller 601 in the main unit 600 retain a language setting independently.

At step S151, the language acquisition module 34 receives a notification of a language setting from the controller 601 in the main unit 600. The notification received at step S151 includes information representing a current language setting and a selectable language. At step S152, the language acquisition module 34 obtains information concerning languages added by the language pack 60, by referring to the tag "meta-data" in the language pack 60. At step S153, the language acquisition module 34 obtains selectable language information from the OS F/W 40. At step S154, the language acquisition module 34 merges languages supported by the language pack 60, the selectable language information obtained from the OS F/W 40, and the language setting notified from the controller 601, to construct selectable language candidates.

At step S155, a user performs an operation to cause the information processing terminal 500 to display a language setting screen 1000. At step S156, the display module 36 obtains the selectable language candidates constructed at step S154 from the language acquisition module 34. At step S157, the display module 36 provides the user the language setting screen 1000 in which the selectable language candidates obtained at step S156 are listed.

At step S158, the user performs an operation to select one language from the list of the selectable language candidates displayed on the language setting screen 1000. At step S159, the display module 36 requests the language setting module 32 to perform language setting. At step S160, the language setting module 32 sends the language setting to the controller 601 with the selected language (the language selected at step S158).

When receiving the language setting, the controller 601 changes a language setting of the controller 601 to the notified language setting, and returns result of the setting to the language setting module 32 (step S161). In response to receiving the result, the language setting module 32 requests the OS F/W 40 to set a language setting at step S162 to change the display language of the OS F/W 40.

If the controller 601 receives a language that is not included in the selectable language of the controller 601, the controller 601 changes a language setting of the controller 601 to a default language setting. For example, if the controller 601 receives a notification to change its language to Arabic and if a default language of the controller 601 is English, the controller 601 changes a language setting of the controller 601 to English and returns a notice indicating that language setting is changed to Arabic to the information processing terminal 500.

Figure 15:
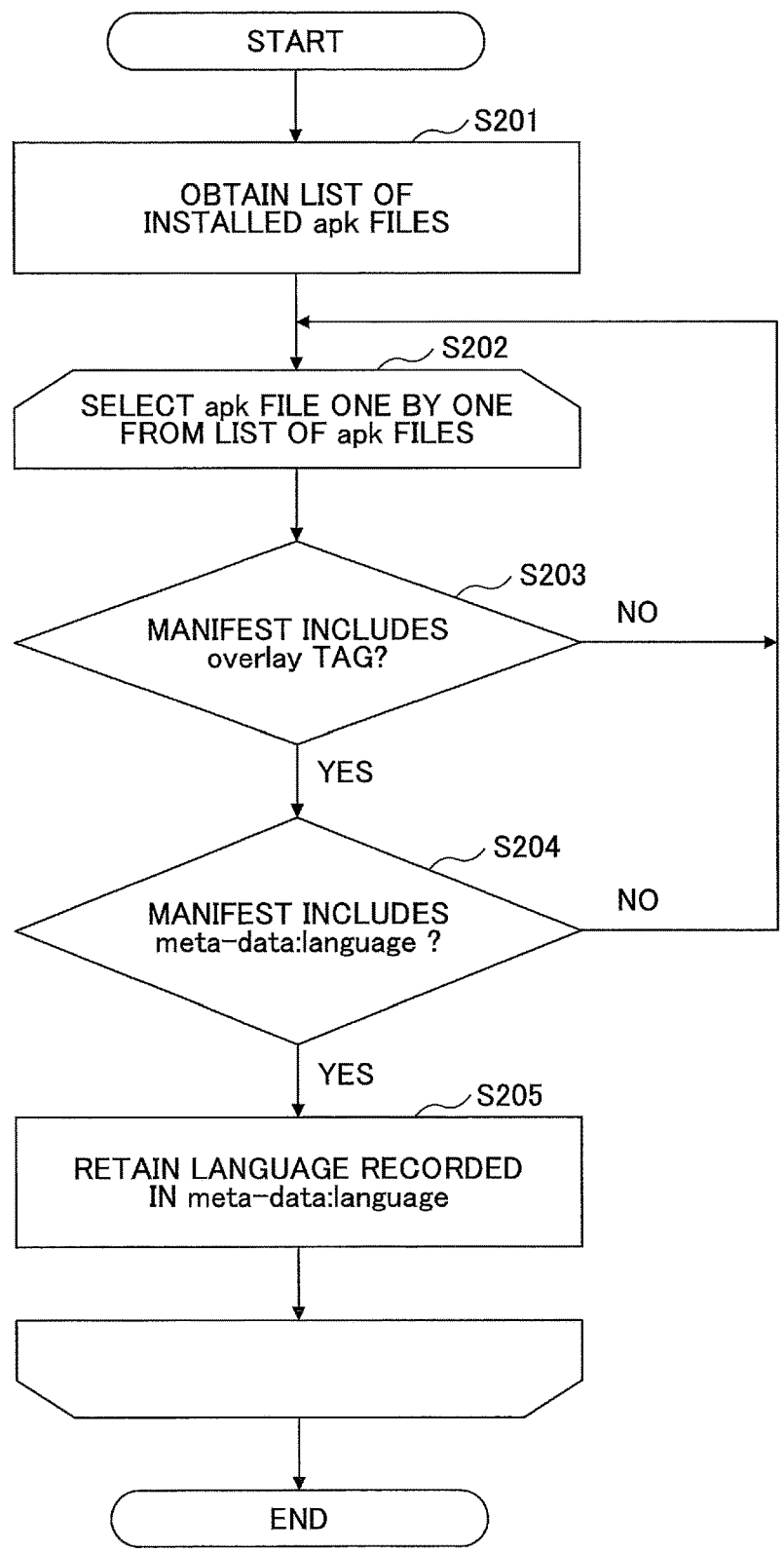
FIG. 15 is a flowchart illustrating a process performed by a language acquisition module to obtain and retain a language of each terminology module.

Details of the process performed by the language acquisition module 34 to obtain and retain a language of each terminology module 20 will be described. FIG. 15 is a flowchart illustrating the process performed by the language acquisition module to obtain and retain a language of each terminology module.

The flowchart in FIG. 15 is different from the flowchart in FIG. 8 in that step S31 in FIG. 8 is replaced with step S201 in FIG. 15. In the process illustrated in FIG. 15, the language acquisition module 34 obtains a list of the APs 10 and the terminology modules 20 stored in a predetermined folder by obtaining the tag "meta-data" (FIG. 6) from the language pack 60. Since other steps in FIG. 15 are similar to the steps in FIG. 8, description of these steps will be omitted.

<Summary>

According to the present embodiment, the information processing terminal 500 and the imaging device including the information processing terminal 500 as an operation unit, in which a language added by installing a terminology module 20 can be selected as a display language for the OS F/W 40 on a language setting screen 1000, can be provided.

Although the present invention has been described with reference to embodiments, the present invention is not limited to these embodiments. Various variations and enhancements may be applied within the scope of the subject matters described in the claims.

What is claimed is:

1. An imaging device including a main unit implementing an imaging function, and an information processing terminal configured to act as an operation unit, the information processing terminal comprising a hardware processor and a hardware memory storing a program that causes the hardware processor to execute a process including:
    obtaining a predetermined selectable language of an operating system and a language of a character string added to an application program by a terminology module;
    displaying a list of selectable language candidates on a language setting screen to enable a user to select a display language of the operating system, the selectable language candidates including the predetermined selectable language of the operating system and the language of the character string added to the application program by the terminology module; and
    changing the display language of the operating system into a language selected from the list of the selectable language candidates by the user.

2. The imaging device according to claim 1, a character string embedded in the application program and the character string added to the application program by the terminology module being given a priority level, wherein the operating system running on the hardware processor is configured to select one of the character strings to be displayed on a screen of the application program among the character string embedded in the application program and the character string added to the application program by the terminology module, based on the priority level and the display language of the operating system.

3. The imaging device according to claim 2, wherein the character string of each language added to the application program by the terminology module is retained in the terminology module for each language.

4. The imaging device according to claim 3, wherein the character string of each language can be added to the application program by installing the terminology module.

5. The imaging device according to claim 2, wherein an installation of the terminology module is performed by installing a language pack module including a plurality of terminology modules of a same display language.

6. An imaging system including a main unit implementing an imaging function, and an information processing terminal configured to act as an operation unit, the imaging system comprising a hardware processor and a hardware memory storing a program that causes the hardware processor to execute a process including:
    obtaining a predetermined selectable language of an operating system and a language of a character string added to an application program by a terminology module;
    displaying a list of selectable language candidates on a language setting screen to enable a user to select a display language of the operating system, the selectable language candidates including the predetermined selectable language of the operating system and the language of the character string added to the application program by the terminology module; and
    changing the display language of the operating system into a language selected from the list of the selectable language candidates by the user.

7. A language setting method for an imaging system including an information processing terminal acting as an operation unit and a main unit implementing an imaging function, the method comprising:
    obtaining a predetermined selectable language of an operating system and a language of a character string added to an application program by a terminology module;
    displaying a list of selectable language candidates on a language setting screen to enable a user to select a display language of the operating system, the selectable language candidates including the predetermined selectable language of the operating system and the language of the character string added to the application program by the terminology module; and
    changing the display language of the operating system into a language selected from the list of the selectable language candidates by the user.

8. The language setting method according to claim 7, a character string embedded in the application program and the character string added to the application program by the terminology module being given a priority level, the method further comprising:
    selecting, by the operating system, one of the character strings to be displayed on a screen of the application program among the character string embedded in the application program and the character string added to the application program by the terminology module, based on the priority level and the display language of the operating system.

9. The language setting method according to claim 8, wherein the character string of each language added to the application program by the terminology module is retained in the terminology module.

10. The language setting method according to claim 9, wherein the character string of each language can be added to the application program by installing the terminology module.

11. The language setting method according to claim 8, wherein the terminology module is installed by installing a pack module including a plurality of the terminology modules of a same language.

* * * * *